United States Patent
Barker et al.

(10) Patent No.: US 8,842,958 B2
(45) Date of Patent: Sep. 23, 2014

(54) EXCHANGE CABLING STORAGE APPARATUS

(75) Inventors: Philip Alfred Barker, Suffolk (GB);
Philip James Longhurst, Suffolk (GB);
John Kerry, Ipswich (GB); Matthew John Kerry, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 456 days.

(21) Appl. No.: 12/996,554

(22) PCT Filed: Jun. 5, 2009

(86) PCT No.: PCT/GB2009/001416
§ 371 (c)(1),
(2), (4) Date: Dec. 6, 2010

(87) PCT Pub. No.: WO2009/147410
PCT Pub. Date: Dec. 10, 2009

(65) Prior Publication Data
US 2011/0081125 A1    Apr. 7, 2011

(30) Foreign Application Priority Data

Jun. 6, 2008   (EP) ..................................... 08251972

(51) Int. Cl.
*G02B 6/00* (2006.01)

(52) U.S. Cl.
USPC ........................................................ 385/135

(58) Field of Classification Search
None
See application file for complete search history.

(56) References Cited

U.S. PATENT DOCUMENTS

| 5,142,606 | A | 8/1992 | Carney et al. |
| 5,375,185 | A | 12/1994 | Hermsen et al. |
| 5,596,670 | A | 1/1997 | Debortoli et al. |
| 6,249,633 | B1 | 6/2001 | Wittmeier et al. |
| 6,370,309 | B1 | 4/2002 | Daoud |
| 6,418,266 | B1 | 7/2002 | Vitantonio |
| 6,434,313 | B1 * | 8/2002 | Clapp et al. .................... 385/135 |
| 6,539,160 | B2 | 3/2003 | Battey et al. |
| 2003/0202765 | A1 | 10/2003 | Franklin et al. |
| 2003/0223725 | A1 | 12/2003 | LaPorte et al. |
| 2011/0135267 | A1 | 6/2011 | Barker et al. |

FOREIGN PATENT DOCUMENTS

| EP | 0215668 | 3/1987 |
| EP | 0859257 | 8/1998 |
| WO | WO99/38042 | 7/1999 |
| WO | WO2008/033997 | 3/2008 |
| WO | WO2008/059187 | 5/2008 |

OTHER PUBLICATIONS

Great Britain Search Report for Great Britain Application No. GB1020657.1 dated Nov. 22, 2012.

(Continued)

*Primary Examiner* — Jerry Rahll
(74) *Attorney, Agent, or Firm* — Patterson Thuente Pedersen, P.A.

(57) ABSTRACT

Apparatus for accommodating an interconnection between a network and service equipment, comprising:
network cable receiving means for receiving a network cable of the network, each network cable including a plurality of network fibers;
service equipment fiber receiving means for receiving a service equipment fiber of the service equipment;
an interconnected fiber store for storing connected fibers comprising the service equipment fiber interconnected to a selected one of the plurality of network fibers;
a network cable store for storing unselected ones of the plurality of network fibers remotely from the interconnected fiber store, the network; and
modifying means to modify the network cable store to protect the interconnected fibers.

5 Claims, 15 Drawing Sheets

(56) References Cited

OTHER PUBLICATIONS

Great Britain Search Report for Great Britain Application No. GB1020663.9 dated Dec. 15, 2012.
Great Britain Search Report for Great Britain Application No. GB1020657.1 dated Mar. 26, 2012.
Prysmian Cables and Systems. Racks. Optical Consolidation Rack (OCR). 3 pages. Issue 5 dated Apr. 2012. www.prysmiangroup.com.
International Search Report for International Application No. PCT/GB2009/001416 dated Sep. 22, 2009.
International Search Report for International Application No. PCT/GB2009/001409 dated Dec. 4, 2009.
Brewer et al., Modular Optical Plant and Access Network: Operational Aspects, Proc. EFOC & N (Technology and Infrastructure) pp. 164-167. 1995.
Application and File History for U.S. Appl. No. 12/996,545, filed Dec. 6, 2010, inventors Barker et al.
Prysmian Cables and Systems. Rack & Cabinets Issued Feb. 1, 2010.

\* cited by examiner

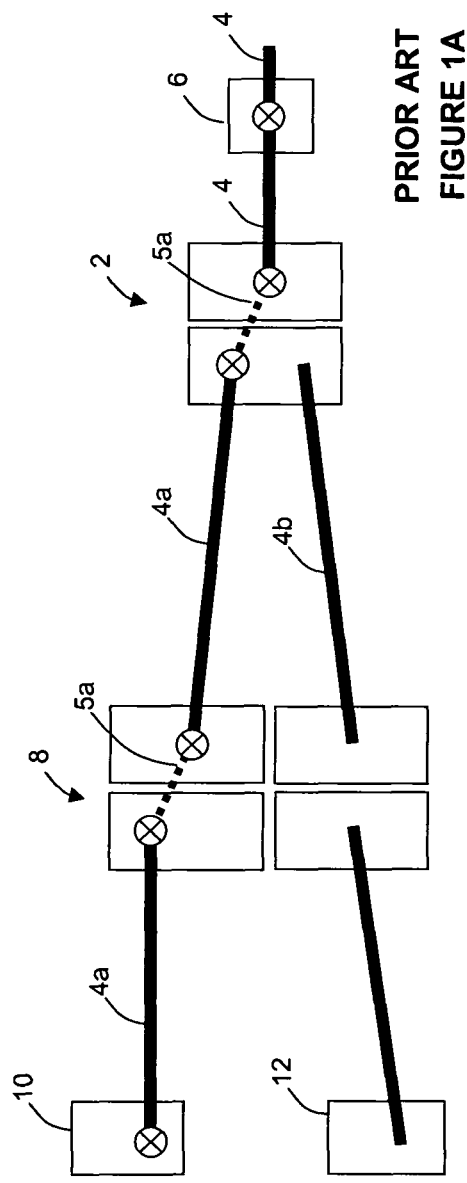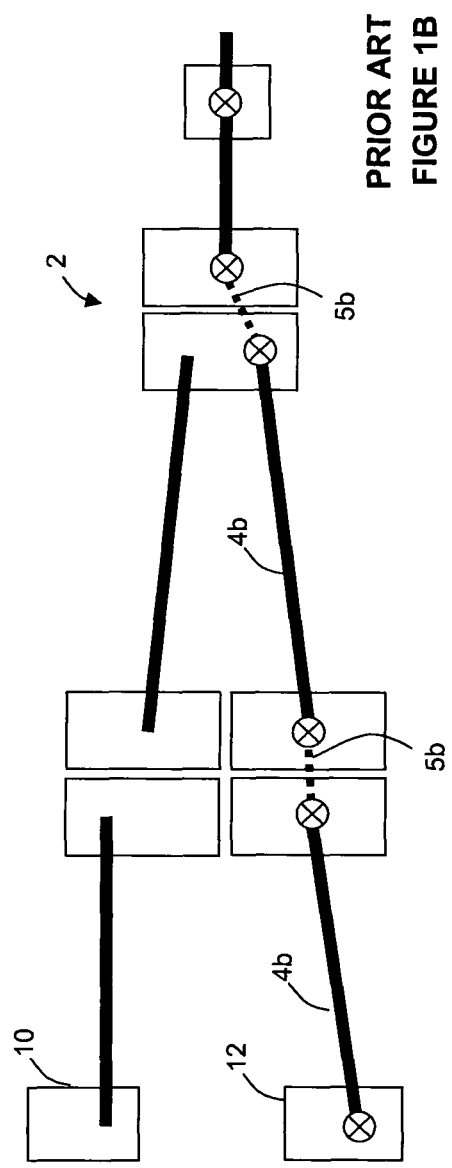

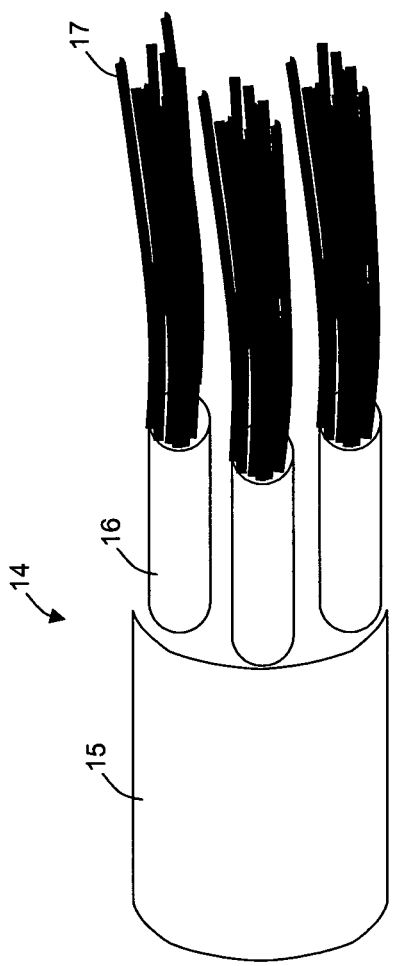
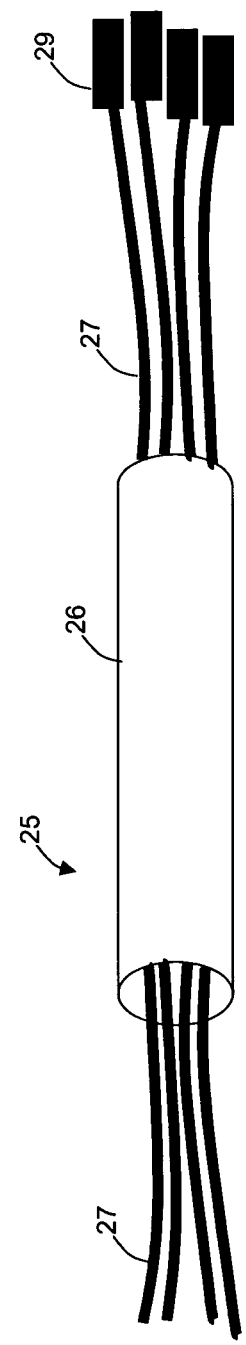
FIGURE 2A
FIGURE 2B

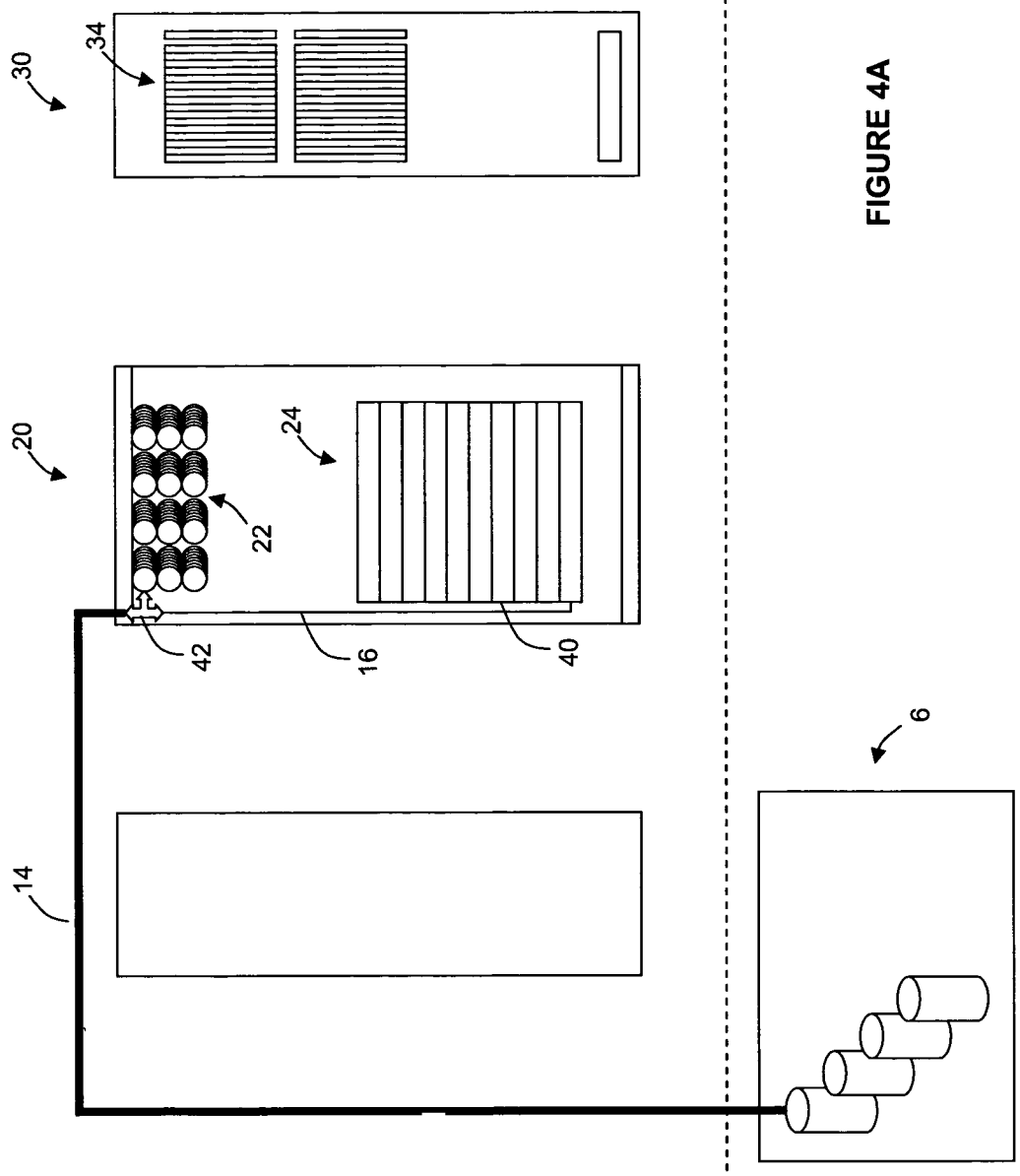

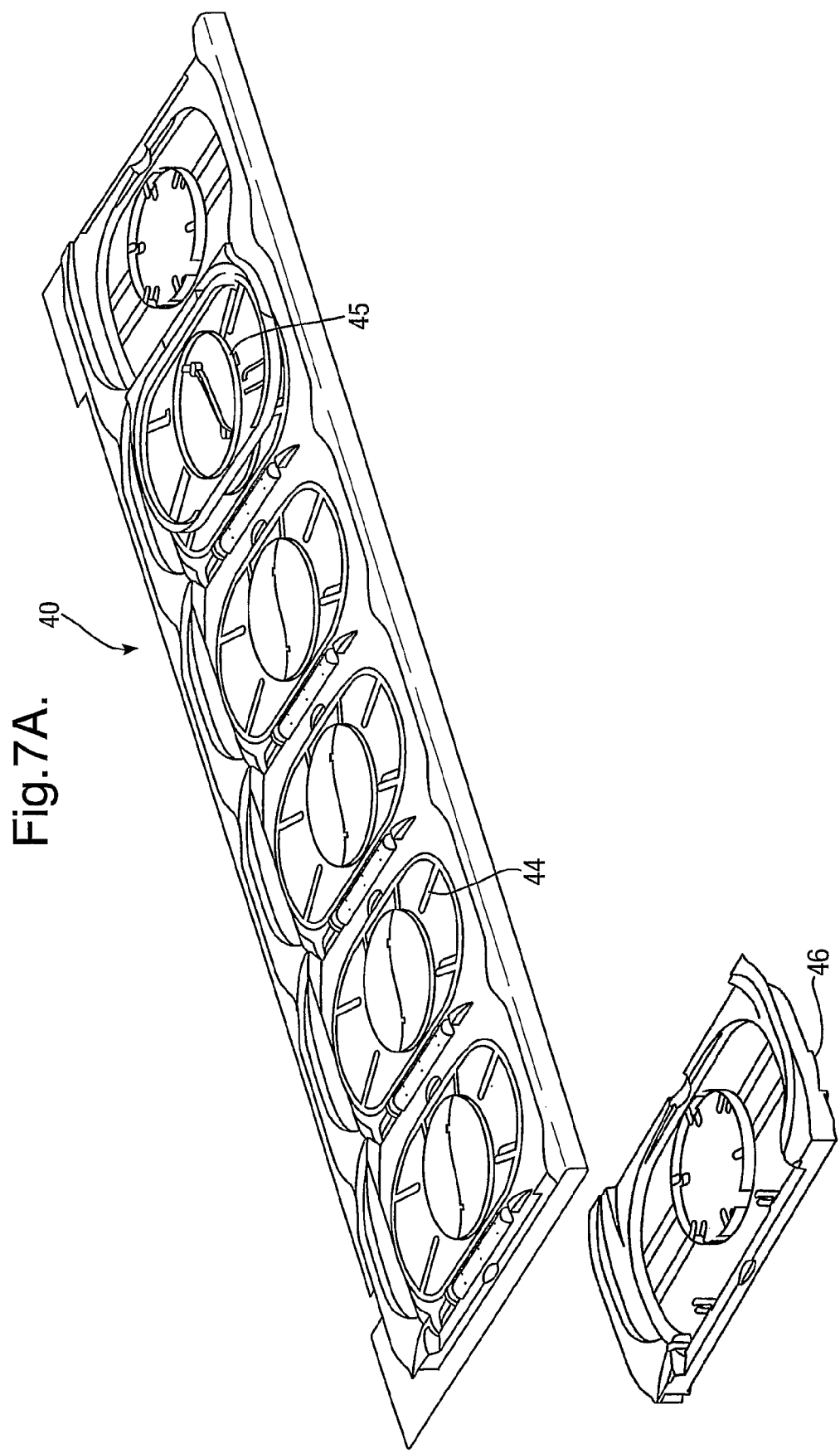

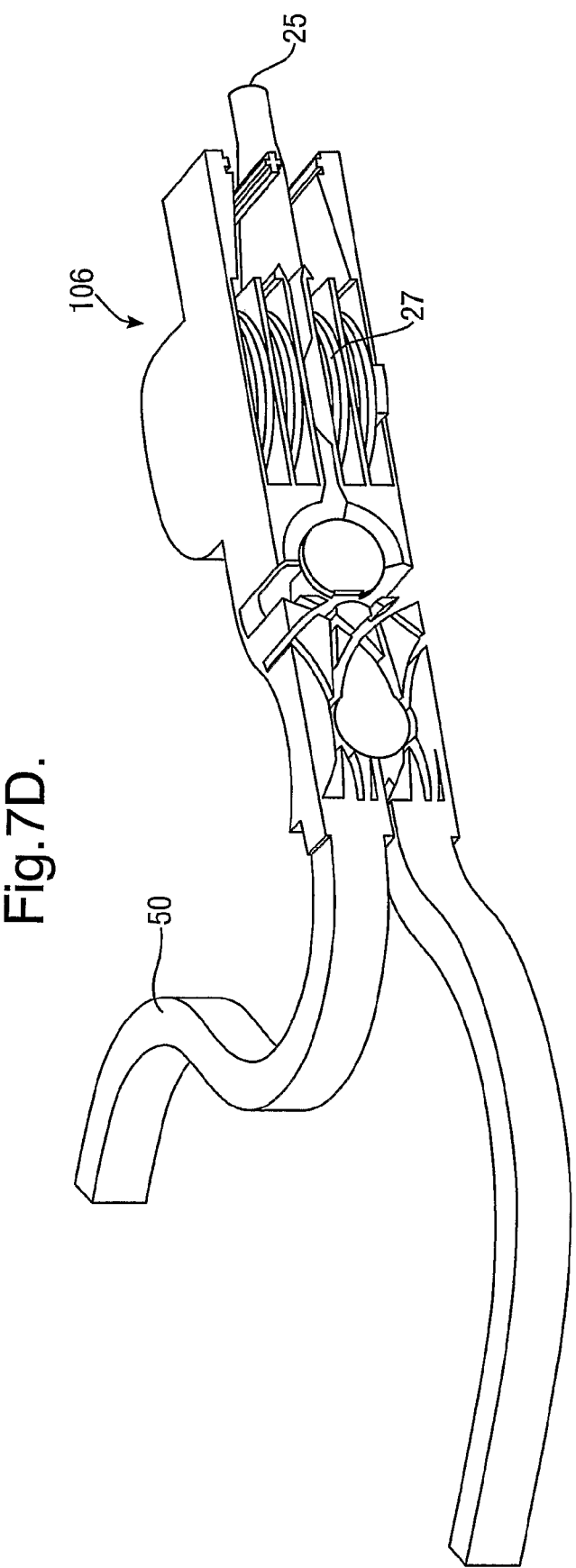

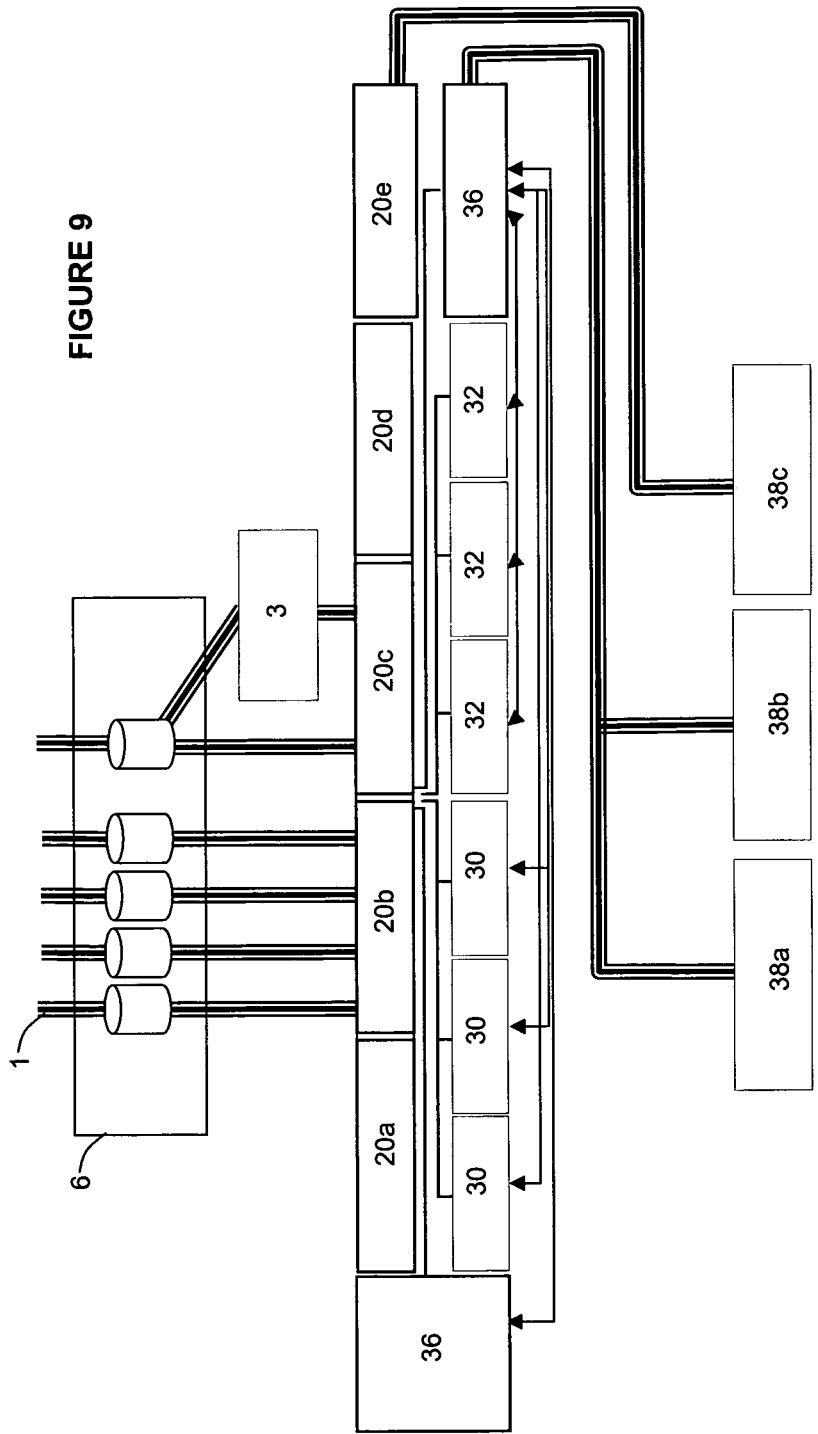

EXCHANGE CABLING STORAGE APPARATUS

PRIORITY CLAIM

The present application is a National Phase entry of PCT Application No. PCT/GB2009/001416, filed Jun. 5, 2009, which claims priority from European Application Number 08251972.9, filed Jun. 6, 2008, the disclosures of which are hereby incorporated by reference herein in their entirety.

TECHNICAL FIELD

This invention relates to apparatus and methods relating to cabling within telecommunications exchanges, particularly but not limited to the accommodation or routing of cables which interconnect electronic equipment located within the exchange, with a telecommunications network external to the exchange.

Optical fiber is commonly deployed in the trunk parts of networks, and this use is gradually extending into the access network, with fiber-to-the premises (FTTP) bringing an optical connection all the way to end user customers. One method of serving FTTP customers is by way of a passive optical network (PON), a point-to-multipoint system using an unpowered optical splitter which links a number (commonly 32 to 128) of customers to a telecommunications exchange via a single optical fiber.

A typical exchange in the UK can serve up to a large number of customers, which can range from a few hundred to tens of thousands or even more, and the building itself may be a vast space over a number of floors. The building would house a large variety and quantity of electronic and other equipment, which provide services required by customers. Such equipment is typically located on equipment racks, and are interconnected to each other in a complex network, as well as to and from customer premises via the external telecommunications network.

This task of carrying the cables in a manner allowing for any piece of equipment to interconnect with any other piece of equipment within the exchange premises is presently carried out by apparatus sometimes known as flexibility racks. The term "interconnection" in this description includes the creation of an interconnection or link or connection by splicing fibers together, or by use of a mechanical or other connector. The terms "cable" and "fiber" denote one and or the other as the context permits. The "flexibility" function arises from their serving as junction or distribution points within the exchange so that a fiber or cable of the external network entering (or exiting) the building can be interconnected to a piece of equipment regardless of where the equipment is located.

In modern exchanges, these racks carry almost exclusively optical fiber, and so are termed optical flexibility, or fiber, racks (OFRs). The racks are typically deployed in pairs forming a "flexibility suite". The flexibility suite comprises a network or line ("L") side rack which receives the network cables and fibers. The other rack in the pair is the exchange or equipment ("E") side receives fiber travelling to and from typically a single equipment rack. The racks include numbers of fiber trays which accommodate and protect the join of spliced fibers. For those L and E side fibers which need interconnection, the respective ends are spliced on trays of the respective racks to a separate jumper or patch cord serving as an intermediary between the two racks which completes the link between the network fiber and the fiber of the equipment rack.

Fibers arriving at the flexibility suite from the network and the equipment rack may arrive singly (e.g. in a point-to-point connection), although it is more and common for them to arrive in a cable which contains a number of individual fibers. For example, each cable optical fiber (COF) used with the flexibility racks contains 144 individual optical fibers. Specifically, the COF comprises a bundle of 12 cable elements, each of which in turn contains 12 fibers. Where not all the fibers of a particular COF require interconnection, those not requiring interconnection are designated and spliced on a fiber tray on the E or L side racks (depending on which side the cables and fibers are arriving from). The unused fiber is thus stored until it is needed for interconnecting by jumpering as described above.

Such conventional methods are commonly known and described in e.g. "Modular Optical Plant for Access Network: Operational Aspects" by D. Brewer et. al (Proc. EFOC & N (Technology and Infrastructure) 1995, at pages 164-167).

With the sheer numbers of customers served by the exchange and the quantity of equipment involved, it can be appreciated that massive amounts of cabling is involved. Work on the fibers include the creation of new interconnections, the re-routing of existing interconnections, the breaking of interconnections which are no longer needed, the identification of what a particular cable interconnects, and so on. Such work with large numbers of cables snaking in all directions throughout the exchange building is very likely to generally give rise to logistical and other problems over time. These problems are brought on and exacerbated by customer number growth, equipment replacement and upgrading, and other such changes within the exchange and in the external network leading to the customer premises.

Current OFRs, such as the exchange racks manufactured by Prysmian S.p.A., have the capacity to accommodate hundreds of fibers in trays, and great numbers of these racks are deployed in exchange buildings both to accommodate and to route fibers and cables. They tend however, to become fully populated quickly, due in part to the need to store unused (i.e. unpatched) fibers on the racks. Over time, severe congestion can occur at the OFRs, which hampers the identification and other dealings with the fibers. It is the experience of the applicants that such unused fibers spliced in fiber trays in the racks often end up never being used. There are many reasons for this: for example, if the customer served by a particular L side fiber never wants a particular service, the need to interconnect that fiber to the relevant equipment rack never arises. In the situation of an overcrowded OFR or exchange, it may be that the fibers requiring interconnection simply cannot be accurately identified or located, and so the safest and most expedient solution is simply to provide another L and E side fiber for interconnection, which of course adds to the congestion.

A solution to the problems raised by cable and fiber overcrowding in the exchange would be desirable.

The method of interconnecting fibers by splicing demands considerable expertise and precision. This already-difficult task is impeded if the engineer has to work in a large, rigid tangle of cables, making the task even more time-consuming and complicated. Another problem with fiber overcrowding at OFRs is that cables and fibers are routed across each other in close proximity, often directly onto each other, so that fibers located under the weight of others above it suffer an increased risk of circuit failure through optical loss and fiber breakage. This problem becomes even more critical as higher bit rate systems are employed, as these tend to be more sensitive to increases in optical loss.

Another determinant of transmission quality is the number of interconnections introduced into the optical link between its transmission and reception ends. Each interconnection introduced into the link, whether it takes the form of a splice, using a connector or otherwise, degrades the quality of the optical transmission across that link. This is the case even if the interconnection is made well. Current exchange cabling methods in exchanges typically involve the interconnection of several lengths of optical fiber interconnected by means of connectors and/or splices. It is rare for a link between the CCJ and an equipment rack to contain fewer than twelve interconnections. Typically, the further the location of a piece of service equipment in the exchange from the incoming fiber of the network, the longer the optical link path, and the greater the number of interconnections in that link. This is because a longer path involves the passing of the link through a greater number of OFR suites which route the link to its destination equipment rack, and the link is spliced twice at each OFR suite: once on each rack making up the suite.

A solution to reduce the number of interconnections required to link a fiber of the external network, to a particular piece of service equipment within the exchange, would be desirable.

A related issue is the growth in the types of services which have become available, which require different equipment types. For example, a PON system serves a number of customer (e.g. 32) per fiber, so the equipment providing this service must include multiplexing in the form of e.g. a wavelength-division multiplexing (WDM). In the current flexibility systems, the splice trays on which the fibers are spliced pre-dedicates the fibers to a certain type of service. Where a particular fiber is to be interconnected to PON service equipment and the splice tray does not support WDM, that splice will have to be broken and the fiber re-routed to another tray, or even another rack, which is WDM-capable.

A solution to provide flexibility in the provisioning of splice trays suitable to a required service, would be desirable.

SUMMARY OF THE INVENTION

In an embodiment, the present invention provides apparatus for accommodating an interconnection between a network and service equipment, comprising
network cable receiving means for receiving a network cable of the network, each network cable including a plurality of network fibers,
service equipment fiber receiving means for receiving a service equipment fiber of the service equipment,
an interconnected fiber store for storing connected fibers comprising the service equipment fiber interconnected to a selected one of the plurality of network fibers,
a network cable store for storing unselected ones of the plurality of network fibers remotely from the interconnected fiber store, and
modifying means to modify the network cable store to protect the interconnected fibers.

In embodiments, the network cable store is modified by the addition of a splice tray to a basic tray arrangement.

In an embodiment, the present invention provides a method of providing an interconnection between a network and service equipment, comprising
providing a network cable associated with the network,
breaking out the network cable to expose a plurality of network fibers contained within the network cable,
selecting one of the plurality of network fibers requiring interconnection with the service rack,
providing an equipment fiber associated with the service equipment,
making an interconnection between the network and the service equipment by splicing the selected one of the network fibers and the equipment fibers,
storing at least some of the remaining un-spliced network fibers at an unspliced network fiber store remote from the spliced fiber store, and
modifying the fiber tray to accommodate the spliced fibers.

BRIEF DESCRIPTION OF THE DRAWINGS

Embodiments of the invention will now be described by way of example only with reference to the accompanying drawings in which:

FIGS. 1A and 1B are schematic views of an exchange including OFRs according to the prior art;

FIG. 2A depicts components making up a cable of the network, and FIG. 2B depicts a cable of an equipment rack;

FIGS. 4A and 4B depict the creation of an interconnection between the network and an equipment rack at the OCR;

FIG. 7A shows a shelf of fiber trays of an OCR;

FIG. 7D depicts E side fiber management at the sub-rack;

FIG. 9 depicts an exchange layout including an number of OCRs.

DETAILED DESCRIPTION

Figure 3:
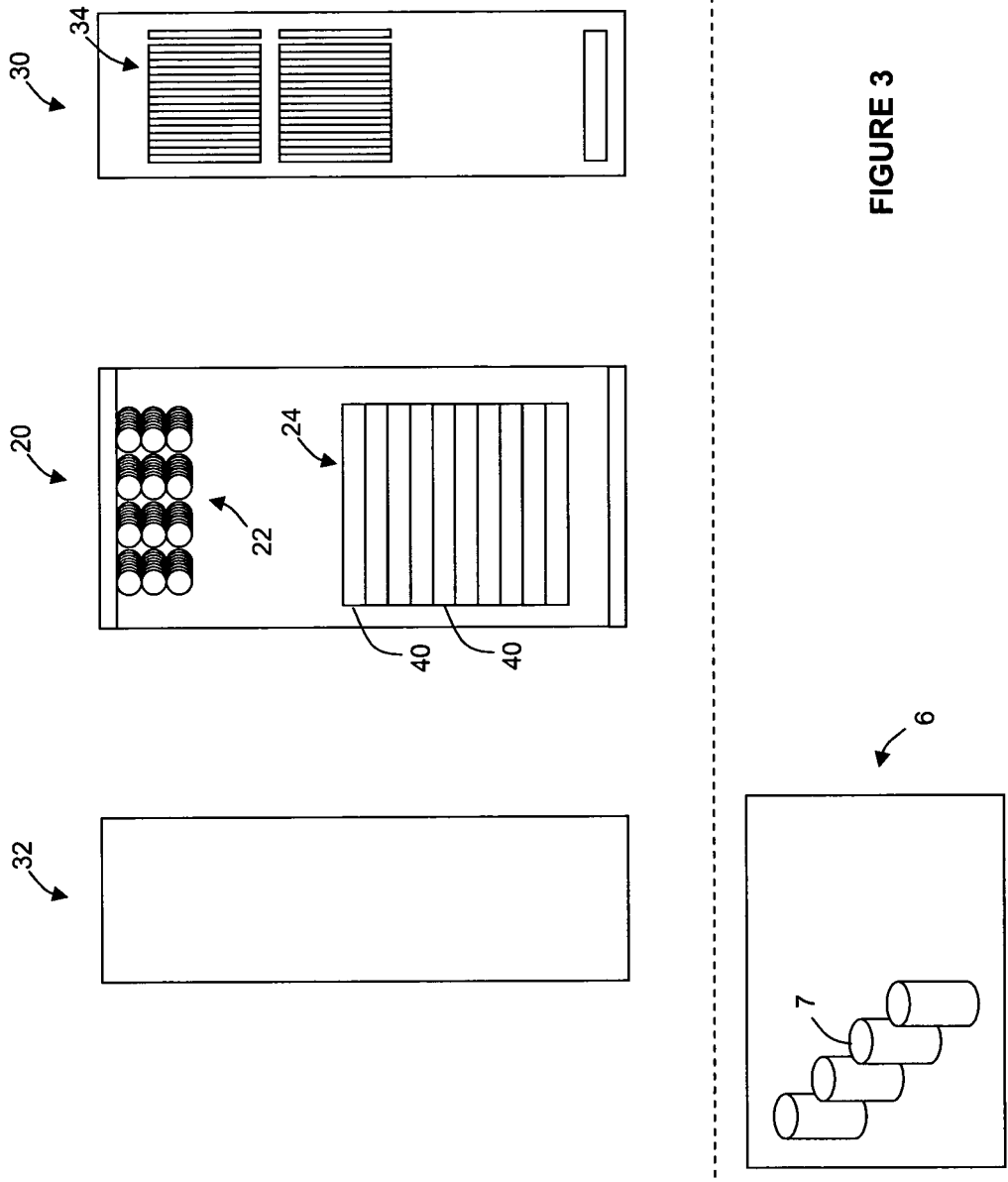
FIG. 3 is a schematic view of a an optical consolidation rack (OCR) of the invention, depicted with the cable chamber joint (CCJ) and two equipment racks.

FIGS. 1A and 1B is a schematic view of a typical layout of an exchange installation of the prior art, which includes a first flexibility suite (2) comprising a pair of optical flexibility racks (OFR) within an exchange building. In FIG. 1A, an incoming fiber or cable (4) from a cable chamber joint (CCJ) (6) is interconnected to a rack of service equipment (10) via a pair of intermediate flexibility suites (8) by means of spliced jumper cables or patch cords (5a) which create a link along a first fiber path (4a) to the service equipment (10). The CCJ accommodates external network cables and fibers. For the avoidance of doubt, an incoming fiber cable includes any fiber or cable from the external telecommunications network or served clients which require connection to the exchange or equipment within the exchange.

The CCJ is typically located within the exchange building (e.g. in the exchange basement), although this need not be the case. The CCJ represents the L side of the exchange for purposes of fiber routing within the exchange so that fiber splice trays, racks, cables, cable elements, fibers, and the like which "face" the CCJ are said to be on the L side. In a similar way, the equipment rack represents the E side.

The cabling used in exchanges typically comprise COF which as described above, comprises a number of individual fibers. The cable arriving at the first flexibility rack (2) is "broken out" by cutting away a section of an extreme end of the outer COF cable sheath, so that the fiber elements and individual fibers within are exposed. Each individual fiber is then allocated to and spliced on splice tray at the L side rack of the flexibility suite (2). As noted above the splice trays of the prior art serves to store a fiber whether it is interconnected through to an equipment rack, or not. In other words, each of the e.g. 144 fibers in the broken out COF is spliced, and occupies a splice tray, whether it is transmitting or not.

In FIG. 1A, the link represented by (4a) is considered to be live as it is patched through to the equipment rack, in contrast to incomplete link (4b), which is merely spliced (but not patched). One splice tray is used per fiber, as this segregates the fibers from each other and prevents "intervention" problems which arise from the possibility of an engineer disrupting a first fiber while working on a second fiber where such fibers are stored together and not segregated from each other. Such "single circuit" splice trays function is primarily to protect the fragile splice portion of two fibers which have been spliced together, by securely locating the spliced fiber and splice protection sleeve within a splice holder. The splice trays also typically include positive bend management means to hold the fiber in the tray, to avoid overbending the optical fiber in view of its minimum bend radius.

After the fibers have been spliced at the L and E side rack pairs, the link requiring interconnection is created by using a jumper or a patch cord (5a) at each rack (2, 8) on the path to the equipment rack (10), which completes the link (4a) from the CCJ (6) to the equipment rack. Unused fibers (e.g. 4b) are similarly spliced and stored in splice trays but not interconnected with jumpers. Thus the path (4b) is complete save that it is not patched through, and only requires the addition of jumper cables at each OFR suite to complete the circuit.

The OFR suites of the prior art are considered to provide "flexibility" of circuit connection within the exchange insofar that they provide routing or junctioning options. Referring to FIGS. 1A and 1B as an example, the incoming fiber (4) may be routed, depending on need, to equipment racks (10) or (12) (via fiber links (4a or 4b)) which may be located on e.g. on different floors of the exchange. Referring now to FIG. 1B, if and when the time comes for the link with the incoming fiber to be re-routed, e.g. from equipment rack (10) to equipment rack (12), the splice on the fiber splice tray of the E side rack of suite (2) between the jumper or patch cord (5a, 5b) and fiber (4a) is broken, so that a new patch cord splice can be created to connect the incoming fiber (4) to the fiber (4b), the ends of which are sitting waiting in splice trays in the racks of OFR suite (8).

Thus the route to the second equipment rack (12) is already defined on "Day 1" (i.e. upon the initial provisioning or installation of the rack, etc., as appropriate within the context of the description) owing to the pre-dedication of the fiber path (4b) between OFR suites leading to the equipment (12). This is so even though it is not or never used, as the link is incomplete only due to the absence of jumpers or patch cords (5a). This arrangement allows for the interconnection to be made between the incoming fiber and the second equipment rack (4) to be flexibly configured by re-directing the patch cord so that it takes route (4b) instead of (4a).

It can be appreciated that even though it is not known on "Day 1" (when the COF cables are broken out at the suites) what services are required, and to what extent, nonetheless all the fibers from the broken out COFs are spliced and taking up a splice trays, whether they are live or unused, whether it is known that they will be needed, if ever, or not. In other words, large numbers of single circuit splice trays are committed, and large numbers of splices made for fibers, regardless of whether they will ever be used.

As noted above, this could, and does, lead to large amounts of unused fiber being stored on fiber splice trays at OFR suites, which are doing nothing more than taking up valuable tray and rack space, and not optimally located should they be required for service. Considerable time and skilled effort is also involved in the creation of splices for such unused fibers. A direct consequence of this is congestion at OFR suites and in the exchange, where the amount of cabling and racks used seldom reflects anywhere near the level of actual transmission activity occurring, owing to the poor utilisation of the fiber, the racks, and other supporting exchange infrastructure. This in turn gives rise to all the problems associated with overcrowding in the exchange, in addition to the simple sheer logistical and other waste of providing and accommodating fiber which may never be used and indeed may be impeding the use and performance of those fibers and equipment which are live and in deployment.

These unused fibers pointlessly occupying splice tray space on the prior art racks are also often difficult, if not impossible, to identify. This is because of the need for a separate system of record-keeping, to note the fibers' existence and identity. Even if records are well-kept at the start, it is likely that over time, a fully-populated flexibility suite of e.g. FIG. 1A may become so crowded that a particular fiber wanted for splicing cannot be found or even seen, even if it is known to be located at a particular rack.

The cables used for creating the interconnection between a selected equipment rack and the external network are shown in FIGS. 2A and 2B. FIG. 2A depicts a COF201 (14) which is one possible choice as cabling for use within an exchange. As noted above, a COF contains a number of individual fibers. The contains 12 intermediate cable elements (16) (three are shown for illustration in FIG. 3A), each containing 12 individual fibers (17). Each COF201 cable thus contains a total of 144 individual fibers. The skilled person would appreciate that the exchange cabling and fiber may comprise a cable having any number of individual fibers therein, and include intermediate sheathing or not, in any arrangement or number. It is possible also that the network cable comprise a single fiber, as might be the case in a point-to-point installation. The COF201 is suitable for L side use; it is also possible for E side use for cabling an equipment rack to a rack.

FIG. 2B shows a specialised version of a multi-fiber cable suitable for E side use (25). This comprises a bundle of individual fibers (27) which are encased in a cable sheath (26). The fibers terminate in a mechanical connector (29) at one end of the cable, and serve as pre-connectorized tails so that they may be connected to e.g. a line card (34) of an equipment rack without need for splicing. The other end of the fiber remains unconnectorized for splicing. Such a cable is known as a "Hydra" cable, and in the present example, comprises e.g. four individual fibers in a bundle as shown in FIG. 3B. Of course, the E side cabling can comprise any number of fibers, including just one, and may or may not be connectorized at one or both ends. As noted above, it is also possible to use a COF as an E side cable.

FIG. 3 shows a flexibility rack (20) according to the invention. As it is configured to flexibly accept interconnections to and from a number of different equipment rack types confirming to various standards and systems as described below, the applicants refer to it as an "optical consolidation rack" (OCR) although it will be appreciated that the aspect of "consolidation" does not limit the inventive concept described herein. Essentially, the rack is capable of "consolidating" the availability of a number—potentially all—the telecommunication services offered to the customer by the exchange, as further explained below.

As shown, the OCR comprises a single rack, in contrast with the pair of racks making up the OFR flexibility suites of the prior art. It will be recalled that the flexibility jumpers (5a, 5b) of the prior art OFR suites of FIGS. 1A and 1B are key to the creation of fiber links using pre-spliced fibers, cable routing and flexibility of circuit connection within the exchange. In contrast, no patching is required in the OCR to create interconnections and to obtain routing. This is because the paths to and from particular equipment racks are not pre-provided (as was the case of fiber (4b) discussed against FIG. 1A), but formed only on demand. Furthermore, fibers which are not live and in use are not spliced at the rack. Thus no patching using jumpers are required.

At its most basic, the OCR (20) comprises accommodation for spliced fibers creating links (without patching) between the CCJ and transmission equipment, where the splice, fiber route and link configuration are created only when the need for the link is identified. In this sense, the exchange cabling method is reactive to need, unlike the current system. Preferably, the OCR includes an unused fiber store (22) for accommodating unused (and unspliced) fibers from the network and transmission equipment.

There is also provided sub-racks (24) of fiber trays as shown in FIG. 3. Unlike the OFR suites or racks of the prior art, the OCR fiber trays are, on "Day 1", not fully-fledged splice trays, but are simply configured for the storage of optical fiber. In other words, these fiber trays would not, from the start, include a splice holder to accommodate a splice protection sleeve. Instead, something which may be more appropriately thought of as a fiber storage tray is provided in the sub-racks, which allow for fiber storage and management, but not for splice protection. This "Day 1" fiber storage tray is configured to accept e.g. an insert or a carrier which allows the tray to additionally protect a splice housed within or on the tray, as will be described further below. For the purposes of this description, the term "tray" or "fiber tray" includes references to either the storage or splice protection function of the tray, or both, as is appropriate in the context of the description.

The function and structure of these components shown in FIG. 3 will be described more fully below. For now, it suffices to note that in one embodiment, the OCR's primary function is to provide storage and protection to individual fibers, whether spliced (live) or unspliced (unused), arriving to and from the network and the equipment racks. Some of these fibers will be interconnected (e.g. by splicing) on "Day 1", and routed to a splice tray on a shelf; others which are not used on "Day 1" are not spliced, but stored for later use. In preferred embodiments, these unused fibers are routed to and stored in dedicated storage within the OCR so as not to occupy space in a shelf (40), but be in a position to be retrievable and become available for use at some point in the future.

On the L side, the OCR functions to accept fibers or cables from a joint (7) of the CCJ (6), and also receives and accommodate E side fiber cables and fibers to and from various equipment racks (30, 32). Advantageously, the equipment racks can carry a variety of equipment types, or else the OCR is able to accommodate fibers arriving from a variety of equipment racks providing a variety of services of e.g. the types described below. For this reason, the OCR is said to "consolidate" within a single rack, a number of services available to customers in the form of connections to more than one of the service equipment types. For example, a gigabit passive optical network (GPON) equipment rack can include optical line termination (OLT) means, which communicates with a number of end customers premises via a passive splitter as noted above. Other racks could carry equipment for the next generation networks (NGN) such as a F-IRS (Fiber Integrated Reception Services) rack, and point-to-point services (i.e. those not carried on a PON). In the example shown in FIG. 3, two equipment rack types are shown to be provided, namely a GPON rack (30) and an NGN rack (32). E side fibers to and from the OCR are interconnected to line cards (34) on the equipment racks.

Figure 4B:
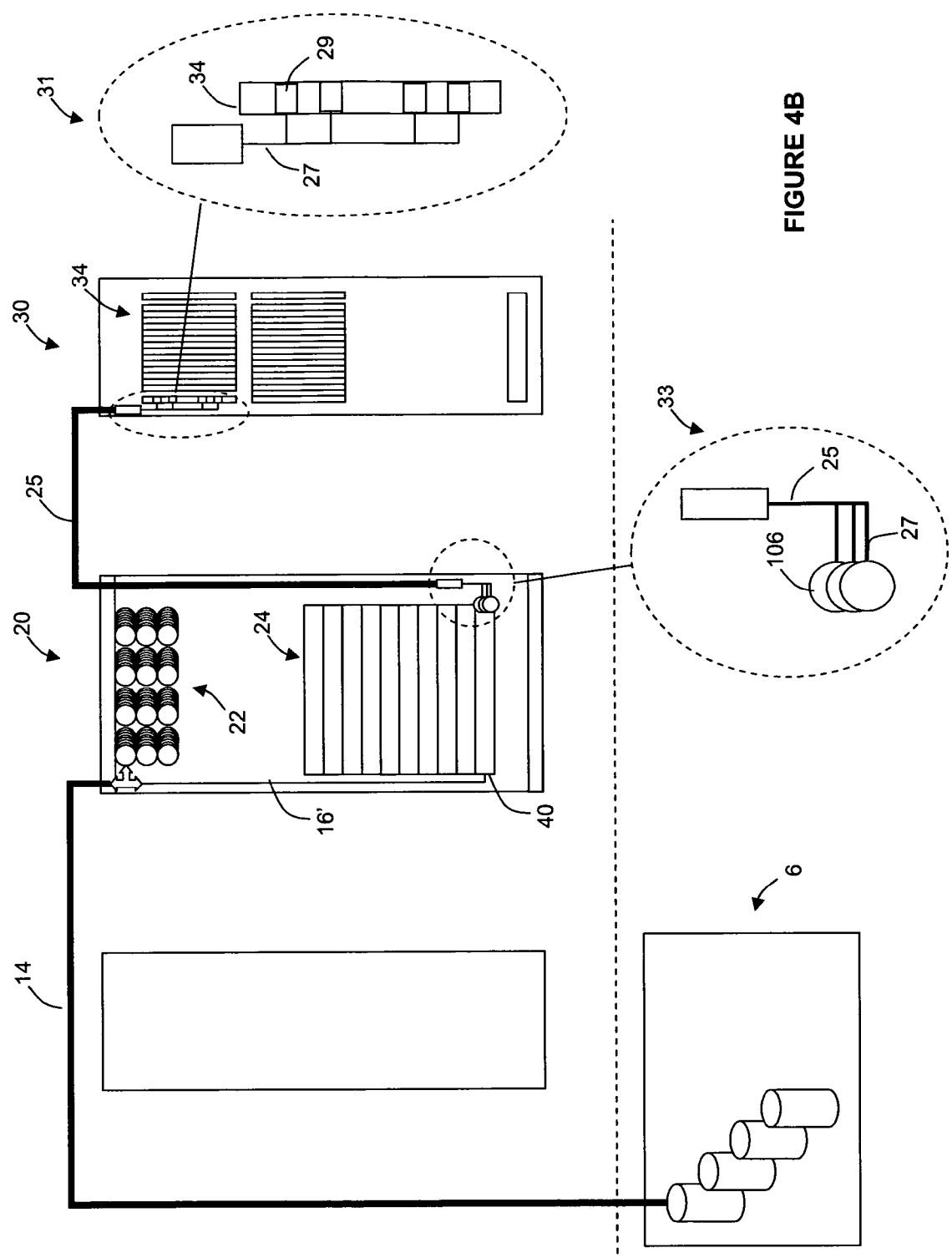

FIGS. 4A and 4B show how an interconnection is made at the OCR (20) between a fiber of the external network and the GPON rack (30). In the scenario depicted in FIGS. 4A and 4B, only one individual fiber needs to be interconnected to the GPON rack (30). The process begins as shown in FIG. 4A, where a COF201 cable (14) is led from a joint (7) of the CCJ (6) to the OCR (20) in response to a need for interconnection. There, the outer sheath (15) of the COF201 (20) is cut to breakout the intermediate cable elements (16 in FIG. 2A). As only one fiber is to be spliced, the COF201 cable element containing that fiber is identified, and the individual fibers (17) of only that cable element is in turn broken out of its sheathing.

Each cable element of the COF201 contains 12 individual fibers. The applicants have adopted the practice of managing fibers thus broken out, by dividing them into two groups of six fibers each. Assuming that the network fiber that needs to be spliced belongs to the first group, all six of the fibers in this first cable element group are brought down to a shelf (40) comprising six fiber trays in one of the sub-racks (24) at the OCR. Each of the six individual fibers is designated its own tray within the shelf: those five fibers not requiring splicing are simply coiled up and stored in their basic fiber trays, while the one to be interconnected is temporarily accommodated in its tray until the fiber from GPON rack is brought to the OCR, which is the next step in the process.

In a preferred embodiment, the fibers are guided along the route to the shelf, to improve the organization of the fibers vertically along the OCR. For example, there could be provided, on "Day 1", routing tubes arranged to connect at the bottom end, to each of the trays of the OCR, through which broken-out fibers are threaded to reach the tray it is destined for. Each routing tube could be configured to accommodate, in this example, six fibers. In this implementation, a space is provided on "Day 1" between the upper end of the routing tubes and the fiber storage (22). This space is, over time, gradually populated by cross-connect tubes, which lead fibers as and when they are broken out, to their destination trays via the relevant routing tube serving the particular destination tray.

As shown in FIG. 4B, in a preferred implementation a Hydra cable is connectorized by connectors (29) at the equipment rack (30) on its line cards (34) as shown in detail (31). The unconnectorized end of the Hydra cable (25) is brought from the equipment rack (30) to the OCR (20), specifically to the fiber tray on the shelf (40) of the sub-rack where the network fiber requiring interconnection has been brought to, and is waiting in a tray. The four fibers (27) of the Hydra cable are then broken out of their sheathing, and the selected one of the Hydra fibers then spliced to the waiting network fiber. Splicing creates the interconnection with a particular L side fiber (16) and a particular E side fiber (27). The spliced fibers are then stored in a fiber tray, which has been modified to include a splice tray to protect the delicate splice. The E side fibers (27) which are not spliced are stored as shown in detail (33) and which will be discussed further below.

Figure 5:
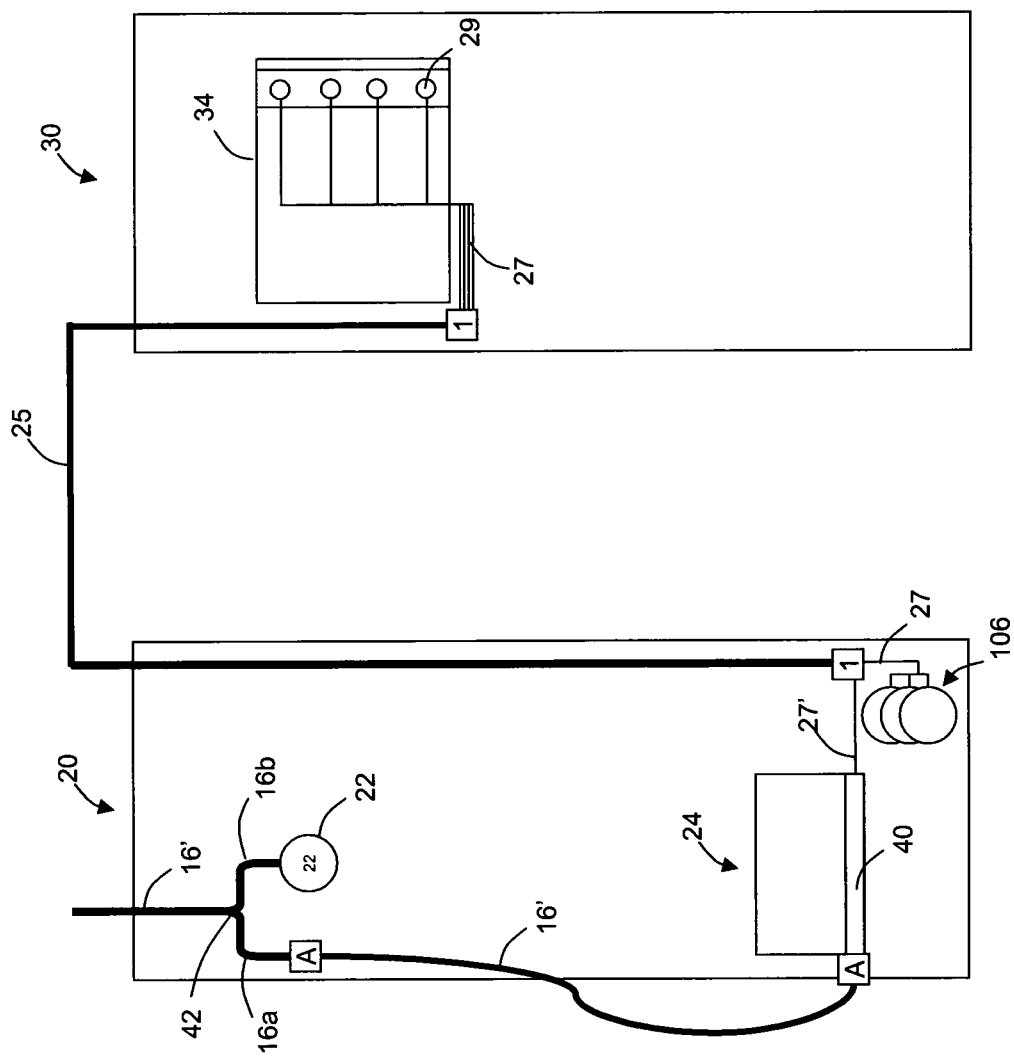
FIG. 5 depicts in more detail the interconnection created at the OCR.

FIG. 5 shows in greater detail the manner of and means for creating an interconnection at the OCR. A cable element (16') from a broken-out COF201 is brought from the CCJ to the OCR. A first group (16a) and a second group (16b) of broken out fibers are formed. The groups are separated using e.g. a "Y"-shaped manifold (42) to direct the two groups to different parts of the rack. The first group (16a) of network fibers includes the one fiber which is to be spliced, which group is tagged for identification (e.g. "A"). All six fibers in this group (16a) are brought down to its designated shelf (40) of fiber trays; the one fiber requiring splicing is placed on a tray ready for splicing. The rest of the unused fibers of group (16a) are allocated basic fiber trays and are stored therein, in an unspliced state, until needed.

On the E side, the four fibers (27) of a Hydra cable (25) have been pre-connectorized to e.g. an OLT line card (31) on the GPON rack (30) at one end, and broken out to expose the individual fibers at the OCR at the other end. The relevant Hydra fiber (27') is identified (e.g. "1") and brought to the fiber tray (40) in the shelf with the waiting L side fiber, and spliced. The fiber storage tray for the spliced fibers is then upgraded to include a splice tray carrier or receptacle, or otherwise to include a splice protection component.

The above describes how spliced (live) fiber are managed and stored. The management and storage of unspliced, unused fibers of the COF201 (from the L side) and the Hydra cable (from the E side) will now be described in connection with FIG. 6.

Continuing to use the example above, it will be remembered that on the L side, only one of the 144 fibers from the COF201 was used. The remaining 143 fibers are unused and unspliced, and consists of:
- 132 of the unused network fibers, still sheathed in the remaining 11 cable elements which have not been broken out; and
- 11 unused network fiber elements remaining from those broken out of the 12th cable element (16'). As noted above, the fibers in this cable element have been managed into two groups (16a and 16b), which is an optional step to ease the management of a large number of fibers. Thus there remains five unused fibers in the first group (16a) (one having been spliced as described above), and six in the second group (16b).

Figure 6:
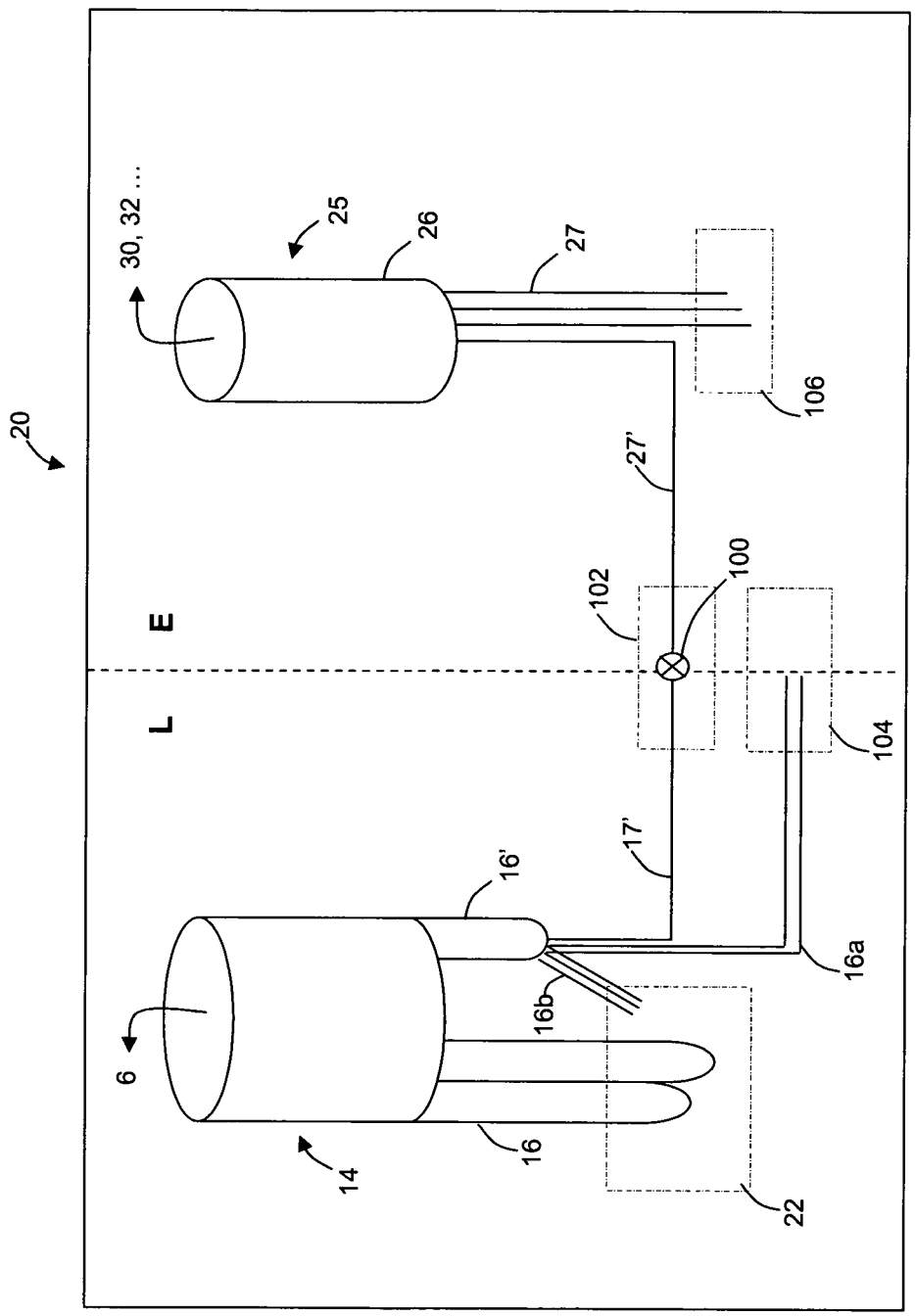
FIG. 6 is a schematic view of the storage of cables and fibers within the OCR.

FIG. 6 is a schematic depiction of the unused fiber storage at the OCR. On the L side ("L") is shown a COF201 cable (14) which fibers (17, 16a, 16b) have been broken out from one of the 12 (only three shown) cable elements (16'). One (17') of the 144 fibers has been spliced (100) to its counterpart (27') from the Hydra cable (25) on the E side. The splice is stored in a fiber splice tray (102).

On the L side: the remaining cable elements (16) which fibers have not been broken out are stored in the unused network fiber storage area of the OCR (22 in e.g. FIGS. 2 and 6). Those unused fiber (16b) which have been broken out of a cable element in the second fiber group are also stored in the unused network fiber store (22). The unused fibers in the first fiber group (16a) have been brought down to the same shelf with the live fiber (17')—these are designated basic fiber trays (104) and are stored, loosely-coiled, unspliced, until the time comes for them to be interconnected. If and when they are spliced, an insert is added to the trays that they are accommodated within, to protect the splice.

On the E side: only the fiber (27') of the Hydra cable (25) which is to be spliced is led to the splice tray (102). The remaining three which do need require splicing are stored as further described below against FIG. 7C, in a separate area away from the shelf and fiber trays.

In the above example, the number of unused fibers residing on fiber trays is reduced to just 5, while in the prior art, an OFR suite would have had 143 fiber splice trays occupied by unused network fiber on the L side, and three trays with unused equipment fibers on the E side. The number of trays taken up by spliced L side and E side fibers is reduced to just one.

The fact that no unused fibers are spliced, and that not all unused fibers are allocated a fiber tray, is not a trivial distinction from the prior art. The invention enables the implementation of a fundamentally different approach in the way and the means for cabling an exchange. In the OFR of the prior art, the idea was to pre-construct the fiber paths between the network and the equipment racks so that if interconnection was required, all that was needed was to patch the two sides of each OFR suite on the route between the equipment rack and the network. To achieve this, each and every fiber arriving at each side of the suite were allocated a rack whether they were to be spliced on "Day 1" or whether they were unused. As noted above, this led to the result of significant fiber wastage, high operational expenditure on splicing, and so on.

The OCR of the present invention on the other hand, allows for interconnections to be made on an incremental basis, and only on demand. The exemplary OCR and method of creating interconnections described better matches supply to demand, so that routes and links are formed only when a customer requires provision of a particular service. The method and apparatus described herein, such as the use of particular cables, and methods to create two network fiber groupings (16a, 16b) from the network cable elements, etc., are adopted for convenience and for greater ease of management only. It can be appreciated that a system according to embodiments of the invention can be implemented so that only live links need to be interconnected, and occupy valuable fiber tray space in the sub-racks, while all unused network fiber is left un-interconnected and preferably stored separately away from the sub-racks, or else in a way which is less space-hungry and/or out of the way. As and when a fresh interconnection is to be made between another two fibers each from the two exchange sides, they can be retrieved from their storage areas, spliced or otherwise interconnected, and only then allocated a splice tray in which it is stored.

Various specific components of the OCR will now be discussed against the drawings in FIGS. 7 and 8.

Figure 7B:
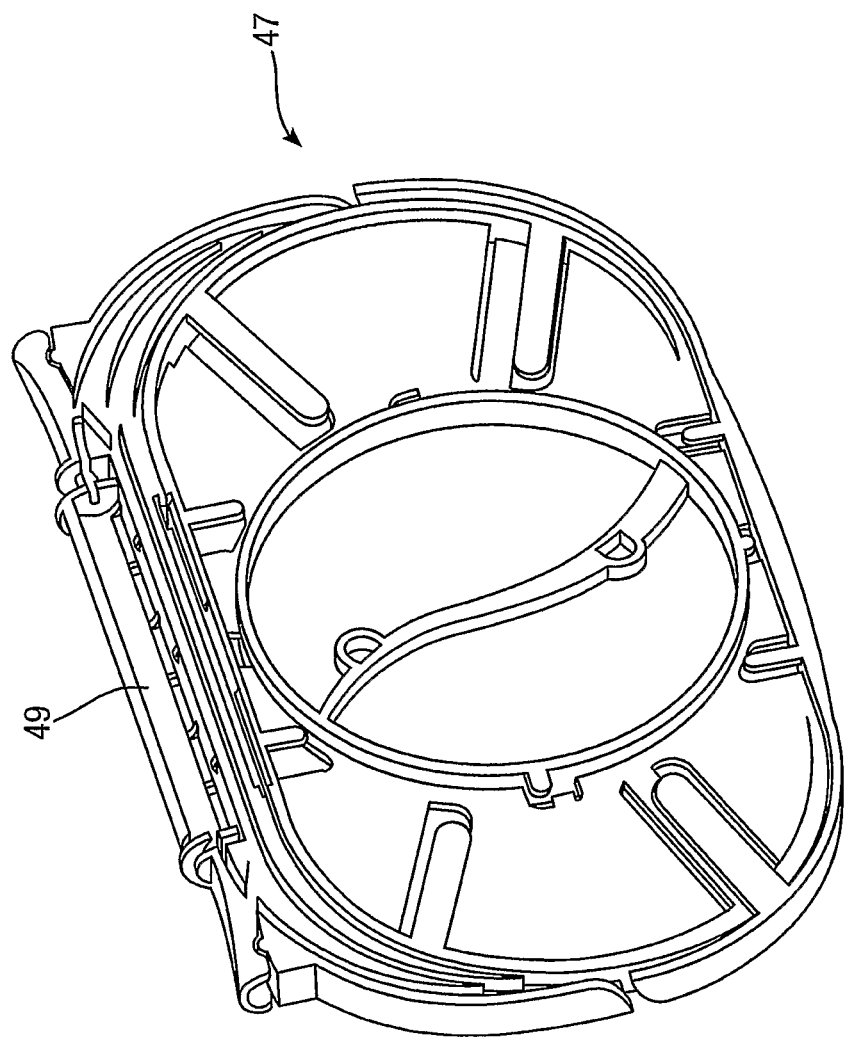
FIG. 7B shows a splice tray carrier.

FIG. 7A depicts a shelf (40) of six trays which are initially provisioned for the storage of unspliced fiber. The trays shown (46) sit in the recess (44) on the shelf, and are configured to accommodate and store a single unspliced (unused) fiber. Thus, they are the "basic" version of the tray, which provide only a nominal amount of bend management to prevent overbending of the optical fibers. A double-sided version of the tray (25) is also shown, which can accommodate two splices, one on each side of the tray. As and when the fiber sitting in the basic tray is to be spliced, a full splice tray carrier (47) is provided into the space on the shelf. Referring to FIG. 7B. the splice tray can added to the basic tray (46) or it could replace the basic tray completely to occupy the space (44) on the shelf (40), depending on exact designs. The tray shown in FIG. 7B includes a wavelength division multiplex (WDM) bay (49) which is suitable for use in a PON network. Fibers not intended for use in PON systems should be used with another splice tray type.

As the OCR is configured to accommodate interconnections to a wide variety of services (GPON, NGN, F-IRS and so on) which are not known on "Day 1", a modular solution allowing for basic trays to be modified or upgraded only when required, allows for different tray types to be used. This can be contrasted with prior art methods, where fibers are committed by splicing to a particular splice tray type on "Day 1". For example, an unused fiber which needs to be used in a PON system will need a splice tray of the type shown in FIG. 7B; if it has already been spliced to a splice tray not including a WDM bay, this splice will need to be broken and re-made, with all the cost, time and effort that would be involved.

As discussed above, some of the used L side fibers are brought down to the shelf, but not spliced. By not providing facilities to accommodate a splice in the basic fiber trays, the risk that an engineer may splice an unused cable in error is removed.

Figure 7C:
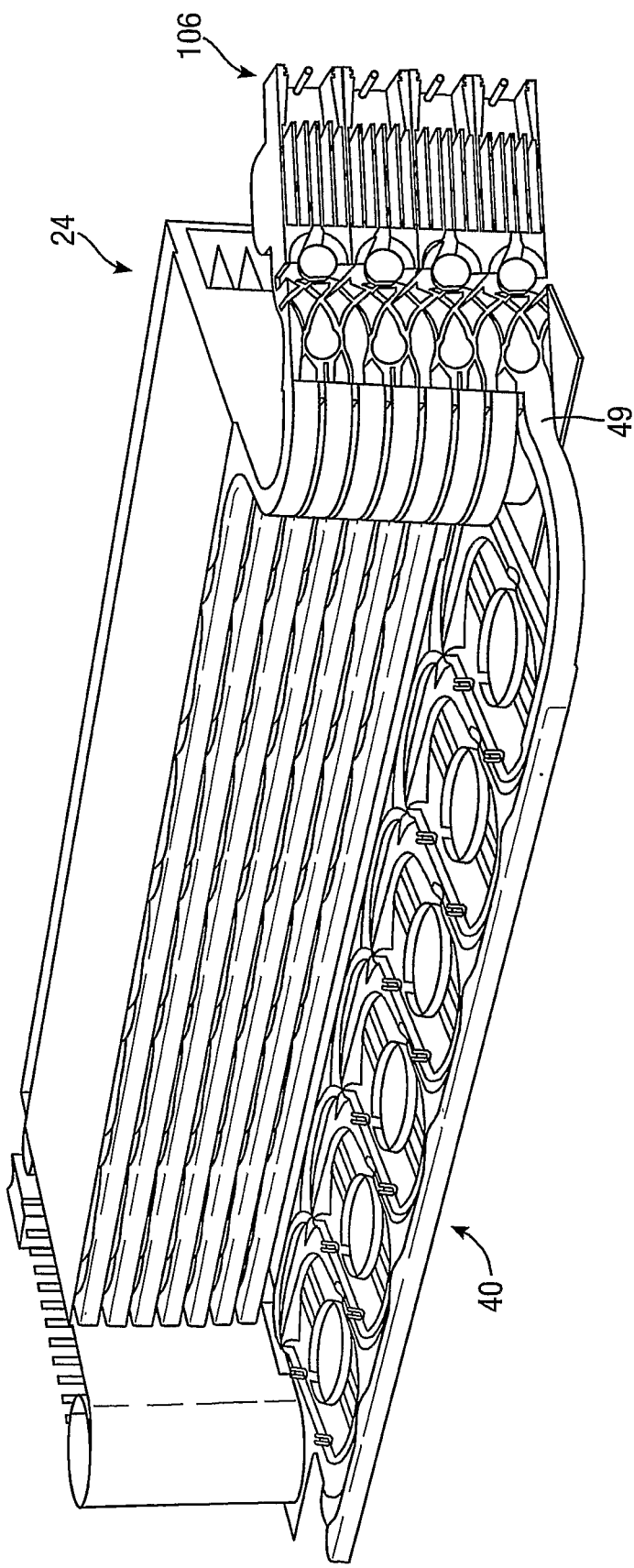
FIG. 7C shows a sub-rack of shelves of an OCR

Turning now to FIG. 7C, it can be seen that a number of shelves (40) e.g. 12, make up a sub-rack (24). In one configuration (see e.g. FIG. 3), an OCR is provided with a bank of eight sub-racks. Manifolds (49) are used for managing the bend of Hydra optical fibers, and these are located at the end of the rack from which the equipment cable (25) enters the shelves. FIG. 7C shows in greater detail the storage space (106) for four individual unused Hydra fibers, located at one of a shelf of trays. Unused Hydra fibers (27) are simply coiled in their storage space near the fiber trays, but not on them. Another view of the storage of E side unused fiber is shown in FIGS. 4B and 5, which depict the storage of three unused fibers (27) were the fourth (27') has been spliced.

Figure 8A:
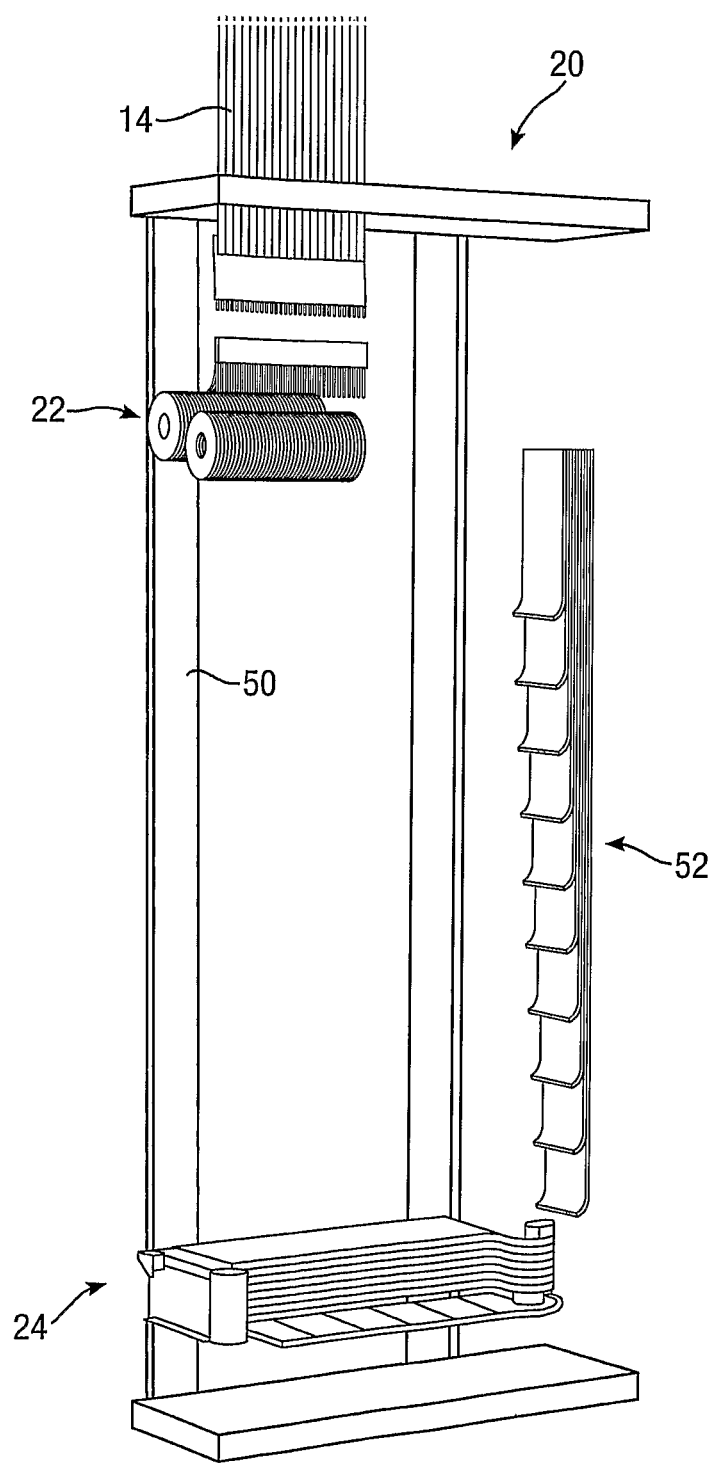
FIGS. 8A to 8C depict fiber and cable storage and management at the OCR.
Figure 8B:
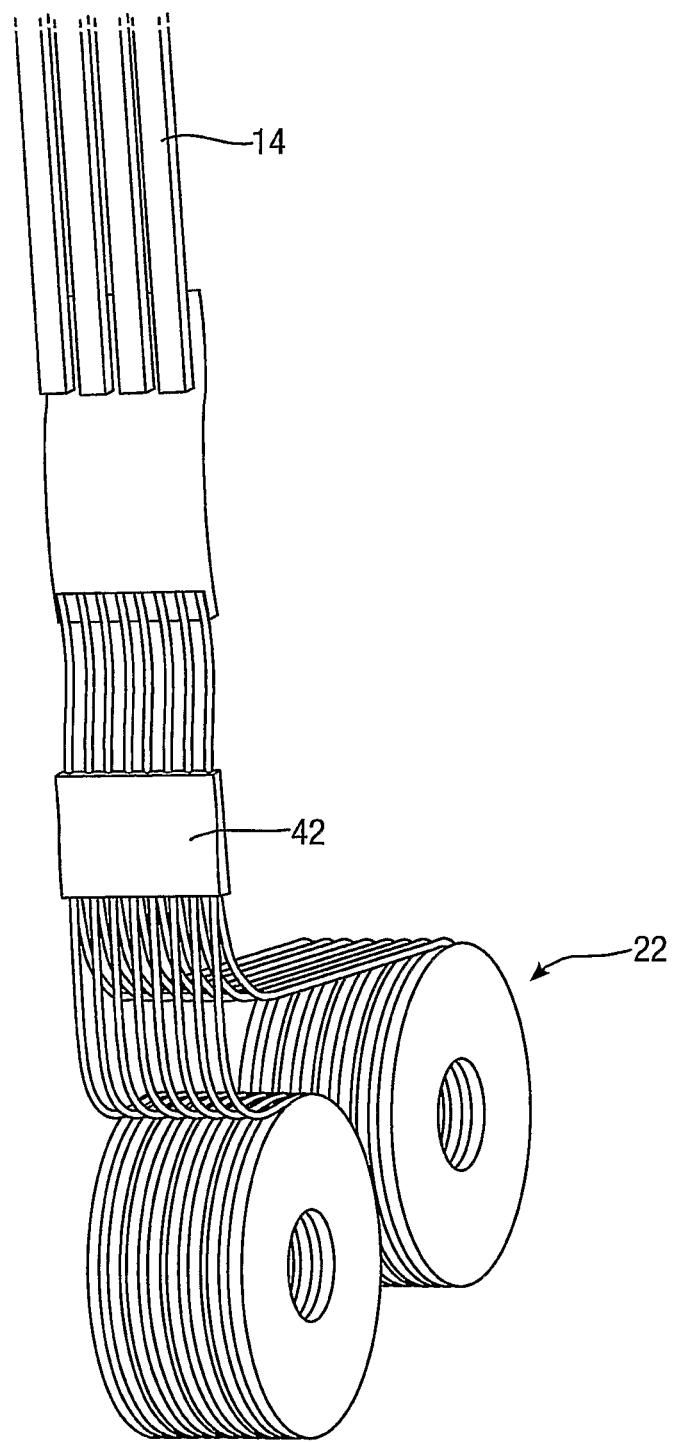

FIG. 8A is an exploded view of some of the components, and the overall structure of, an OCR. Sub-racks (24) of trays are attached to the frame (50). Control of the bend radius of the E side optical fiber arriving at the rack is managed by a mandrel (52). As shown in greater detail in FIG. 8B, L side fiber is led to the OCR in the form of COF201 (14) which is eventually broken out; unused elements are guided by a manifold (42) to the unused network fiber storage containers (22).

Figure 8C:
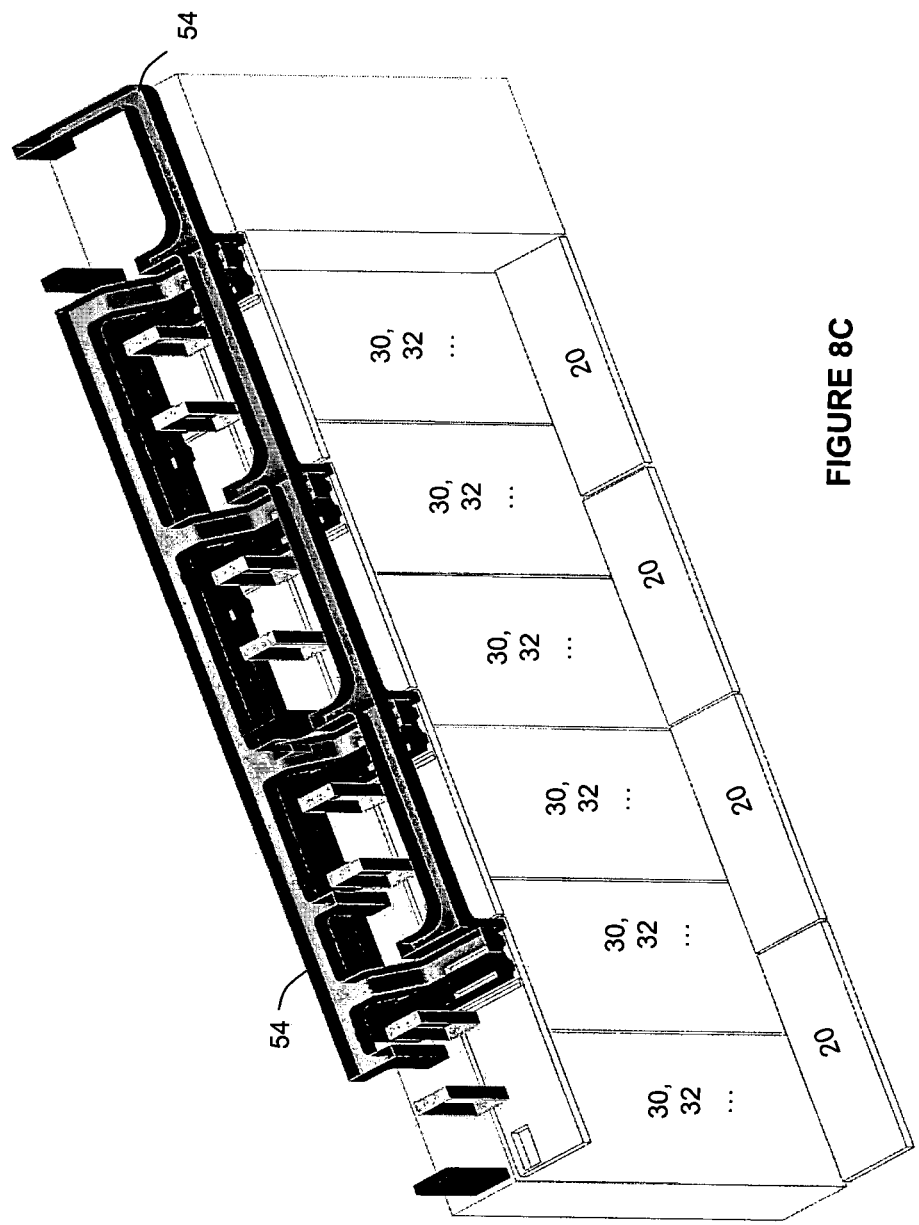

FIG. 8C shows a configuration of a bank of four OCRs (20), arranged back to back with a number of equipment racks (30, 32, etc.). Running along the top of the OCR bank are the cable management components, comprising cable raceways (54), along which cables to and from the equipment racks are led into and from the OCRs.

FIG. 9 shows an exemplary arrangement within a telecommunications exchange which includes a bank of OCRs of the invention. Spine cables (1) lead from the external network into an exchange via one or more joints (7) in a CCJ (6). Some legacy connections can be led into the exchange via legacy OFR suites (3). The remaining external network cables are led to a bank of OCRs (20), each of which is designated to form interconnections with specific equipment rack types. In the example shown in FIG. 9, OCRs (20a and 20b) are configured to communicate with the GPON racks (30), while the rest are designated the NGN rack (32). One or other of the groups of OCRs are also designated to interconnect with other rack types (36). COF201 cables (14) provide the connections between the CCJ and the OCRs, and the OCRs to various communication providers (38a to 38c) (in the context of unbundled local loop). Hydra cables (25) lead to and from equipment racks and OCRs.

Following on from the adoption of the exemplary OCR and cabling method described, a variety of advantages can be achieved. These include:

A reduction in exchange floor space requirement over the prior art OFR suites based on fiber circuit capacity, which is becoming a pressing issue with increasing numbers of customers driving the deployment of increasing amounts of fiber and cable, and equipment and other racks and infrastructure;

Improved and easier record capture, e.g. by adoption of color coding, numbering, bar-coding, RFID-tagging of the various elements and components such as of cables, cable elements, individual fiber, fiber trays, shelves, sub-racks, cable raceways, etc.;

Deferment of implementation costs until demand exists for service provision by providing connections and links only on demand;

All plant and cable can be more fully used over their planned lifetime;

Provide a scalable solution to meet both new build and full fiber deployment requirements, and the requirements of a variety of exchange sizes;

Reduction in numbers of fiber splices between the equipment rack port and the CCJ, compared to OFR suites of the prior which requires three or four splices at the least; and Jumper cables no longer necessary, so no jumper splicing required.

The skilled person would appreciate that owing in part to the nature of the invention, many alternative implementations and configurations are possible, both in respect of the structure of the OCR, the arrangement within the exchange, and the method by which interconnections are made, the cabling is routed and so

The invention claimed is:

1. Apparatus for accommodating an interconnection in an exchange between a network and service equipment in the form of a splice created by splicing a network fiber associated with the network and a service equipment fiber associated with the service equipment, the apparatus comprising:
    a sub-rack, the sub-rack further comprising:
        a store for storing the service equipment fiber before splicing; and
        a row of fiber storage trays, each fiber storage tray being configured for storing a network fiber before the network fiber is spliced, each fiber storage tray being further configured to be added to or replaced by a splice tray to accommodate the splice when created.

2. Apparatus according to claim 1 wherein each of the fiber storage trays accommodates a single fiber.

3. Apparatus according to claim 1 wherein each of the fiber trays includes means for managing fiber bend.

4. Apparatus according to claim 1 wherein the splice tray includes a wave division multiplex bay.

5. A method of providing an interconnection in an exchange between a network and service equipment in the form of a splice created by splicing a network fiber associated with the network and a service equipment fiber associated with the service equipment using the apparatus of claim 1, comprising:
    storing in the store the service equipment fiber before the service equipment fiber is spliced;
    storing in the fiber storage tray the network fiber before the network fiber is spliced;
    adding a splice tray to the fiber storage tray, or replacing the fiber storage tray with the splice tray; and
    using the splice tray to accommodate a splice created by splicing the network fiber to the service equipment fiber.

* * * * *